Figure 1:
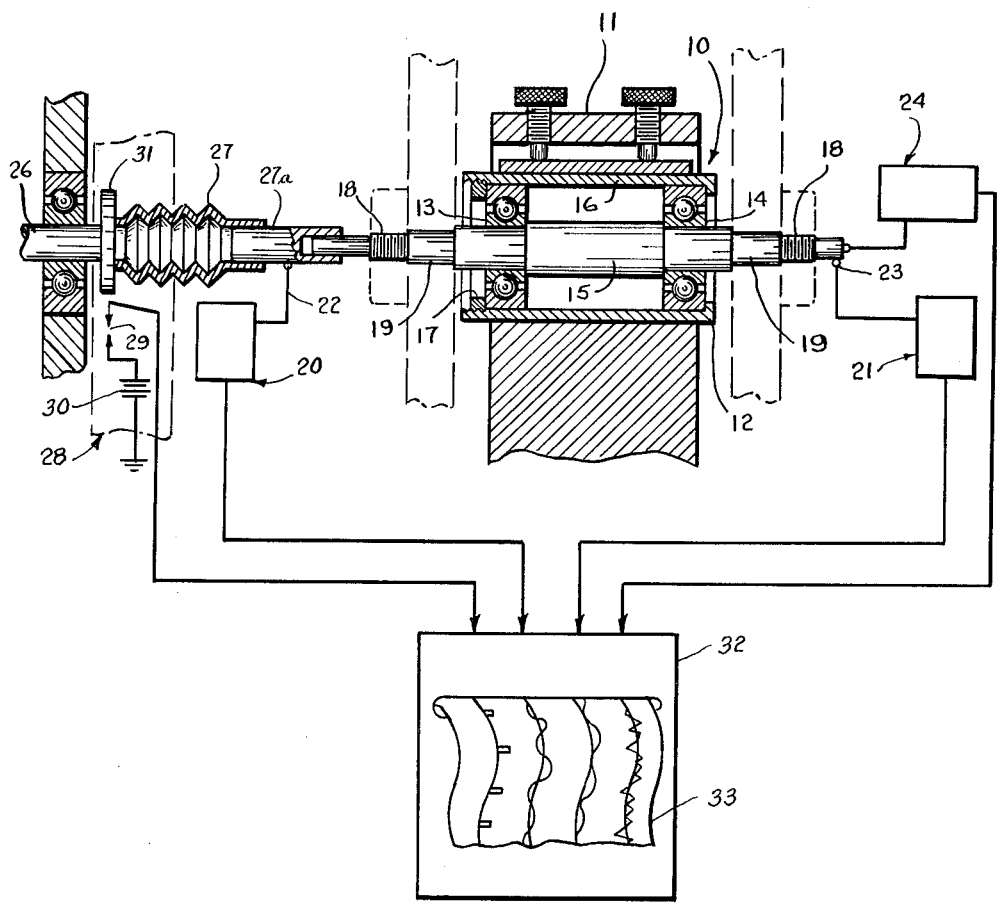

Aug. 24, 1965  E. R. SILVIA  3,201,996
BEARING TESTING APPARATUS
Filed Nov. 29, 1961  2 Sheets-Sheet 2

INVENTOR.
EVERETT R. SILVIA
BY
ATTORNEY.

United States Patent Office 3,201,996
Patented Aug. 24, 1965

3,201,996
BEARING TESTING APPARATUS
Everett R. Silvia, Huntington Station, N.Y., assignor to American Bosch Arma Corporation, a corporation of New York
Filed Nov. 29, 1961, Ser. No. 155,654
5 Claims. (Cl. 73—432)

The present invention relates to test gauges and has particular reference to inspection and evaluation of bearings.

The need for better and more accurate means of bearing evaluation and inspection has come about in manufacture of precision gyroscopes in particular. In this instance spin-bearing instability directly degrades gyro performance and because the spin-bearing is typically a stiffy preloaded assembly, imperfect geometry causes internal stress and wear conditions which shorten bearing life. Although intensive effort has been expended to develop adequate bearings the situation is still marginal where high precision gyros are concerned. To insure adequate performance and bearing life, therefore, rigorous inspection and a high degree of selection must be depended upon.

The present invention depends upon the fact that if the geometry of a bearing is perfect, the rotor journalled in the bearing will revolve about a fixed axis. If the bearing is imperfect the axis of revolution will be an instantaneous axis only and the spatial location of every point on the rotor will fail to repeat for each revolution. The maximum variation exhibited by an arbitrary point on the rotor during sufficient number of revolutions will directly reflect the level of imperfection within the bearings. Since the balls and raceways move at different velocities their relative positions change continuously as the rotor revolves. In order to obtain a true maximum variation, therefore, the number of revolutions sampled must be large enough to permit the interaction of the various imperfections to become additive and then subtractive at least once during the test run. In bearings of usual proportions it has been found that at least twenty revolutions are necessary.

In a preferred embodiment, the outer race of the bearing under test is secured in a fixture and the shaft journalled in the bearing is rotated through a flexible coupling. The radial motion of the shaft is monitored at each end as well as the axial motion at one end. The linear displacements measured at each of the three positions are recorded over a period of about twenty revolutions, as is the start of each revolution. Comparison of the repeatability of the characteristics for each revolution will indicate acceptability or unacceptability of each bearing.

The test finds particular use in checking of assembled bearing packages where gauging of component parts prior to assembly does not give adequate assurance that the assembled bearing is satisfactory.

For a more complete understanding of the invention, reference may be had to the accompanying diagrams, in which—

Figure 2:
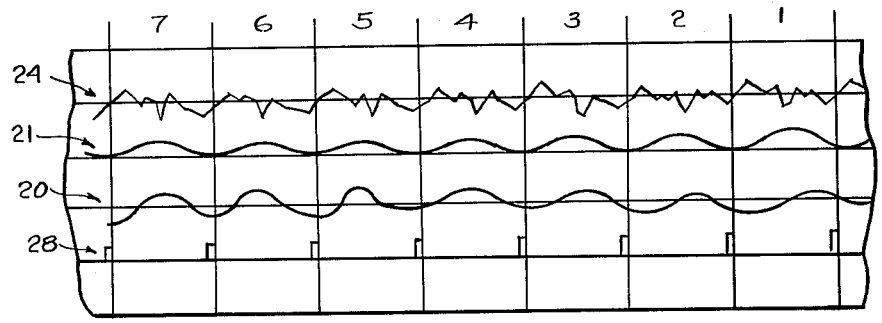
Figure 3:
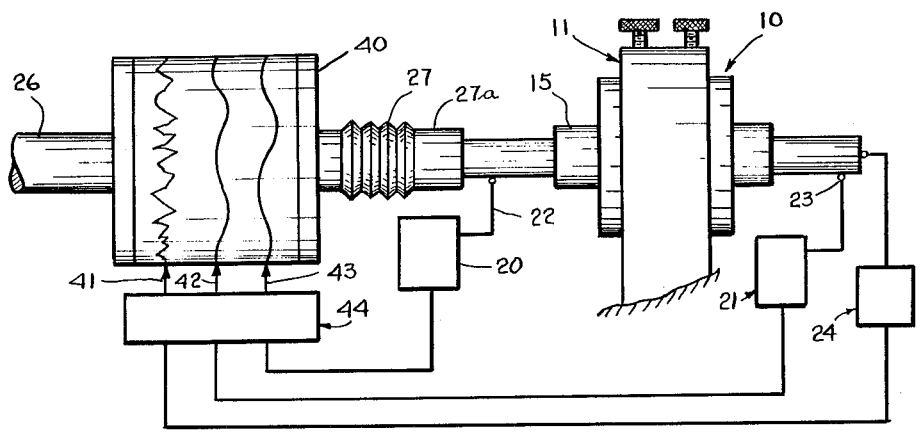

FIGURE 1 is a schematic view of one embodiment of the invention showing the bearing in section;
FIGURE 2 is a typical record of tests; and
FIGURE 3 is a modification of FIGURE 1.

With reference now to FIGURE 1, a typical bearing cartridge 10 is held in a fixture 11 for the "non-repetitive" test of this invention. The cartridge 10 includes an outer sleeve 12, a pair of ball bearings 13, 14 in the sleeve 12 and a rotor shaft 15 in the bearings 13, 14. The inner races of the bearings 13, 14 may abut against shoulders on shaft 15. The outer race of bearing 14 abuts against the lip 16 on sleeve 12 so that by adjustment of the threaded ring 17 which bears against the outer race of bearing 13 a preload may be applied to the bearings 13, 14. Shaft 15 may also be provided with threads 18 at the extremities of portions of reduced diameter 19 on which the gyroscopic rotor wheels shown dotted can be mounted and secured by nuts on the threaded ends 18.

Sensitive linear displacement pickoff devices 20, 21 are positioned near the ends of the shaft 15. The feelers 22, 23 of the pickoffs 20, 21 are urged against the surface of shaft 15. The outputs of the pickoffs are indicative of the lateral position of the feelers 22, 23, and therefore of the position of the surface of the shaft at the point of contact of the feelers 22, 23. In general, eccentricities and irregularities of the bearing and shaft will result in a variable pickoff output, as shaft 15 is rotated, which, however, should be repetitive over each revolution of the shaft. If the output is not repeatable it can be concluded that the bearing is at fault and that the axis of rotation of shaft 15 is not fixed. If the range of uncertainty of the axis of rotation is within a certain predetermined maximum, the bearing would be acceptable, but axis uncertainties above that maximum would be cause for rejection.

Another pickoff 24 is employed to detect axial movement, i.e., to check axial repeatability. Here again, non-repetitive displacements above a certain predetermined maximum would be a sound basis for rejection of the bearing. An additional set of radial (or lateral) pickoffs (not shown) may be arranged to be responsive to lateral movements in a direction perpendicular to that detected by pickoffs 20, 21 if desired (in and out of the plane of the drawing). The degree of non-repetition due to imperfection of the fixed raceways that may be sensed in any one radial plane is determined by the orientation of that plane. Two orthogonal planes improve the odds that the full effect of fixed race imperfection will be sensed. A more complete evaluation can be obtained by taking several runs and re-orienting the radial sensing plane for maximum non-repetitive readout.

Shaft 15 is driven by drive shaft 26 through an axially and radially flexible connector 27 and a coupling member 27a. A revolution indicator 28, provides a single pulse each time drive shaft 26 makes one revolution, and may comprise a pair of normally open contacts 29, a source of voltage 30 and a cam 31 on shaft 26 for momentarily closing contacts 29 as shaft 26 rotates through a reference position for example.

The outputs of pickoffs 20, 21, 24 and revolution indicator 28 are connected to the inputs of a recorder 32 which makes a permanent visual recording on a tape 33 of the output of pickoffs. FIGURE 2 shows a typical trace generated by the pickoff outputs for seven revolutions of shaft 26. The trace of indicator 28 defines the beginning of each revolution.

Pickoff 24 output is similar and repeatable over each revolution showing that the axial position of shaft 15 does not change during rotation.

Pickoff 21 output is similar and repeatable over each revolution showing that the axis of rotation of shaft 15 is constant. Ordinarily, the output of pickoff 20 would also be repetitive if the output of pickoff 21 is repetitive but for purposes of illustration, the trace of pickoff 20 is shown as a non-repetitive output which indicates that the axis of rotation of shaft 15 is not fixed.

The degree of non-repeatability may be checked by superimposing all of the traces of each pickoff. The thickness of the resulting pattern is indicative of the uncertainty of shaft position.

When detailed analysis of bearing imperfection is not required, as in "go-no-go" inspection the alternative recording scheme, shown in FIG. 3 may be used. Here the recorder comprises a drum 40 driven by shaft 26 upon which the three markers 41, 42, 43 scribe traces according to the outputs from pickoffs 20, 21 and 22 which are connected to the marker control mechanism 44. The resulting pattern on the drum 40 is then an immediate superposition of the individual traces. The traces in FIGURE 3 can be interpreted as indicating that the outputs of pickoffs 20 and 24 are repeatable since only a single trace appears opposite markers 41 and 43 while the output of pickoff 21 is not repeatable since a plurality of traces appears opposite marker 42.

I claim:
1. In a device of the character described for testing the steadiness of the axis of rotation of a bearing adapted to support a shaft journalled therein,
    fixture means for holding said test bearing in fixed position,
    means for rotating through a predetermined number of revolutions a shaft journalled in, and extending beyond, said bearing,
    pick-off means for producing an output signal indicative of radial displacement of one end of said shaft with respect to said fixture in a direction substantially perpendicular to the axis of said shaft,
    recording means for making a permanent recording of said output signal for all of said revolutions of said shaft, and
    means connecting said recording means and said rotating means to relate said output signal to the angular position of said shaft at which said output signal is produced, whereby a comparison of the permanent recordings of the pickoff output for each revolution of the shaft provides an indication of the steadiness of the axis of rotation of said bearing.

2. Apparatus in accordance with claim 1, wherein said recording means includes a drum driven in rotation by said shaft rotating means.

3. Apparatus in accordance with claim 1, comprising also a cam-operated switch responsive to attainment by said shaft rotating means of a predetermined reference angular position to close its contacts momentarily, and means for applying an input voltage to said recording means through said switch to produce indications at said recording means of the times of occurrence of said reference angular position of said shaft rotating means.

4. Apparatus in accordance with claim 1, comprising second pick-off means having its sensing elements positioned adjacent the opposite end of said shaft for producing an output signal indicative of radial motion of said opposite end of said shaft with respect to said fixture, and means for making a permanent recording of said last-named output signal in said recording means.

5. Apparatus in accordance with claim 1, comprising another pick-off means having its sensing elements positioned adjacent one end of said shaft for producing an output signal indicative of axial motion of said shaft with respect to said fixture, and means for making a permanent recording of said last-named signal in said recording means.

References Cited by the Examiner

UNITED STATES PATENTS

| | | | |
|---|---|---|---|
| 2,333,040 | 10/43 | Pope | 73—69 |
| 2,468,648 | 4/49 | Abbott et al. | 73—67 |
| 2,608,090 | 8/52 | Barker et al. | 73—67 |
| 2,793,525 | 5/57 | Mims | 73—67 |
| 2,796,759 | 6/57 | Baugh et al. | 73—67 |
| 2,892,152 | 6/59 | Buisson | 73—71.4 |
| 3,070,995 | 1/63 | Broder et al. | 73—71.4 |

OTHER REFERENCES

German Application 1,104,710, Apr. 13, 1961.

RICHARD C. QUEISSER, *Primary Examiner.*

ROBERT EVANS, *Examiner.*